Nov. 12, 1957
J. S. WALSH
2,812,960
ANTI-CORROSION ROTARY AIR-SEAL ASSEMBLY
Filed May 21, 1954
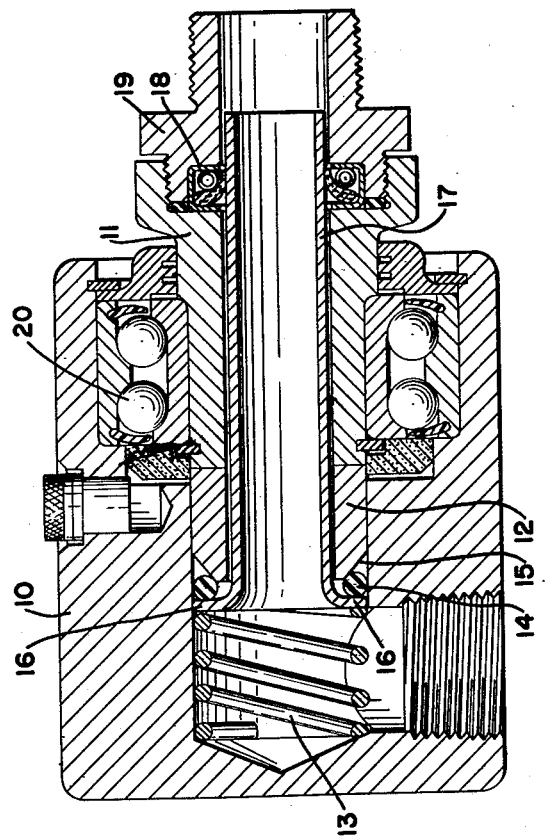
INVENTOR
JOSEPH S. WALSH
BY Willard D. Eakin
ATTORNEY

2,812,960
ANTI-CORROSION ROTARY AIR-SEAL ASSEMBLY

Joseph S. Walsh, Fairview Park, Ohio, assignor to Fawick Corporation, a corporation of Michigan Application May 21, 1954, Serial No. 431,339

1 Claim. (Cl. 285—276)

This invention relates to rotary fluid seals such as are used for conducting fluid from a non-rotary source into and out of a hollow rotary member such as a shaft.

Such seals commonly comprise a tubular metal slip-seal member and a second tubular slip-seal member, commonly of a carbon composition, aligned with and abutting the end of the first mentioned member in slip-seal relation.

When the fluid conducted through the seal is air and is frequently changed from high pressure to low pressure, as in charging and venting a pneumatic clutch, for example, moisture in the air, and especially moisture condensed by expansion and consequent cooling of the air, finds its way onto the slip-seal surfaces and causes corrosion of the metal surface, sometimes to the extent that leakage between the slip-seal faces results, with or without scoring of the carbon surface by the corroded metal surface.

My object is to provide in a convenient and economical manner against damage of the slip-seal surface or surfaces by moisture present in or condensed from the conducted fluid.

The single figure of the accompanying drawing is a longitudinal middle section of a rotary seal embodying my invention in its preferred form.

The assembly comprises the usual non-rotary casing 10 having journaled in it a tubular nipple 11 adapted to be secured in fluid-conducting relation to the end of a rotary hollow shaft or the like.

The casing is formed with a cylindrical guideway in which is mounted the usual tubular carbon slip-seal member 12 which is in slip-seal contact with the nipple 11, being urged against the latter by a compression spring 13, through a self-energizing O-ring 14 which is wedged between the wall of the guideway and a taper face 15 formed on the adjacent end of the carbon member 12, thus preventing escape of fluid between the said wall and the carbon member while permitting the latter to maintain constant sealing pressure against the nipple.

Interposed between the spring 13 and the sealing ring 14 and sealing against the latter is an external base flange 16 formed on the adjacent end of a tubular metal shield 17 which, supported wholly by the said base flange, projects forward through the slip-seal member 12 and for a substantial distance into the nipple member 11, but with a little radial clearance from them for avoidance of any frictional or cramping effect in the rotation of the nipple.

A radial-and-thrust bearing 20 holds the members 10 and 11 in constant relationship axially and radially of the assembly.

The O-ring 14 provides a static sealing of the flange 16 to the slip-seal ring 12 and slidably seals the two of them to the wall of the bore in which the ring 12 is slidably mounted.

Air passing in either direction through the seal has at least substantially its entire current in the shield 17 throughout all of the vicinity of the slip-seal surfaces, air passing into the narrow annular space between the shield and the nipple only if and as allowed by leakage from that space, if any. Consequently no substantial air current occurs in that space such as would blow moisture to or onto the slip-seal surfaces.

Still further protection can be obtained by mounting a light pressure, non-wearing seal, such as the known type of seal 18, between the shield 17 and the nipple 11, preferably, as shown, at a substantial distance from the mated slip-seal surfaces.

For mounting this type of seal the nipple, instead of being threaded for directly screwing it into a shaft, is coupled to an auxiliary member 19 which is so threaded, the two members being shaped to provide an annular space between them for the seal 18.

Modifications are possible without departure from the scope of the invention as defined in the appended claim.

I claim:

A rotary air-seal assembly comprising two air-conducting members formed with respective cylindrical bores opening upon oppositely facing surfaces of said members respectively, radial-and-thrust bearing means interposed between said members and holding them in constant relationship axially and radially of the assembly, with their said oppositely facing surfaces adjacent to each other, a slip-seal ring of carbonaceous composition slidably mounted in the bore of one of said members and having rotary-slip-seal relation to the adjacent surface of the other one of said members, a tubular shield within and extending from one into the other of said bores, means statically sealing said shield member to said slip-seal ring and slidably sealing the two of them to the wall of the bore in which the said slip-seal ring is slidably mounted, a spring constantly urging said slip-seal ring, shield and sealing means, in constant relation to one another, toward the one of said members with which said slip-seal ring has rotary-slip-seal relation, and light-pressure, non-wearing, annular, rotary-seal means between the last mentioned member and the tubular shield.

References Cited in the file of this patent

UNITED STATES PATENTS

| Re. 17,569 | Phillips | Jan. 21, 1930 |
| 2,382,135 | Crew | Aug. 14, 1945 |
| 2,413,217 | Corey | Dec. 24, 1946 |
| 2,429,929 | Fisher | Oct. 28, 1947 |
| 2,495,129 | Perrine et al. | Jan. 17, 1950 |
| 2,549,174 | Coward | Apr. 17, 1951 |
| 2,653,041 | Wilson | Sept. 22, 1953 |
| 2,740,646 | Bard | Apr. 3, 1956 |